United States Patent
Yamaguchi et al.

(10) Patent No.: US 8,742,360 B2
(45) Date of Patent: Jun. 3, 2014

(54) COMPTON CAMERA

(75) Inventors: Mitsutaka Yamaguchi, Maebashi (JP); Hirofumi Shimada, Maebashi (JP); Takashi Nakano, Maebashi (JP); Naoki Kawachi, Takasaki (JP); Kazuo Arakawa, Takasaki (JP); Tadayuki Takahashi, Sagamihara (JP); Shin Watanabe, Sagamihara (JP); Shinichiro Takeda, Sagamihara (JP); Hirokazu Odaka, Sagamihara (JP); Yoshikatsu Kuroda, Komaki (JP); Masahiro Kato, Komaki (JP); Kei Genba, Komaki (JP)

(73) Assignees: National University Corporation Gunma University, Gunma (JP); Japan Atomic Energy, Ibaraki (JP)

( * ) Notice: Subject to any disclaimer, the term of this patent is extended or adjusted under 35 U.S.C. 154(b) by 159 days.

(21) Appl. No.: 13/059,715

(22) PCT Filed: Aug. 21, 2009

(86) PCT No.: PCT/JP2009/064671
§ 371 (c)(1),
(2), (4) Date: Jul. 14, 2011

(87) PCT Pub. No.: WO2010/021387
PCT Pub. Date: Feb. 25, 2010

(65) Prior Publication Data
US 2011/0260071 A1 Oct. 27, 2011

(30) Foreign Application Priority Data
Aug. 22, 2008 (JP) ................................. 2008-213928

(51) Int. Cl.
*H01L 27/146* (2006.01)
*G01T 1/166* (2006.01)
(52) U.S. Cl.
USPC .............................. 250/370.09; 250/363.04

(58) Field of Classification Search
USPC .................................................... 250/363.04
See application file for complete search history.

(56) References Cited

U.S. PATENT DOCUMENTS 5,532,490 A * 7/1996 Gullberg et al. ......... 250/363.04
5,841,141 A * 11/1998 Gullberg et al. ......... 250/363.04
6,484,051 B1 * 11/2002 Daniel ........................ 600/436

FOREIGN PATENT DOCUMENTS

| JP | 6201832 A | 7/1994 |
| JP | 2005208057 A | 8/2005 |
| WO | WO-2007145154 A1 | 12/2007 |

OTHER PUBLICATIONS

"Fast Algorithm for list mode back-projection of Compton scatter camera data," IEEE Transactions on Nuclear Science, vol. 45, No. 3, Jun. 1998, p. 957-961 to Wilderman et al.*
"Determination of the Attenuation Map in Emission Tomography," Journal of Nuclear Medicine, vol. 44, No. 2, Feb. 2003, p. 291-314 to Zaidi et al.*
International Search Report and Written Opinion for International Application No. PCT/JP2009/064671 mailed Oct. 6, 2009. 5 pages.

* cited by examiner

*Primary Examiner* — David Porta
*Assistant Examiner* — Kenneth J Malkowski
(74) *Attorney, Agent, or Firm* — Wilmer Cutler Pickering Hale and Dorr LLP

(57) ABSTRACT

Plural camera heads are each placed in a position capable of detection of radiation emitted from a radiation source. Compton cones obtained from the detection data output from each of the plural camera heads are projected onto three-dimensional space and an image based on the radiation source is reconstructed. In addition, projected images from projecting Compton cones obtained from the detection data output from each camera head onto two-dimensional planes are also employed for determining a three-dimensional space excluding regions where the radiation source is not present. Reconstruction of images based on the radiation source is then performed within the determined three-dimensional space.

2 Claims, 15 Drawing Sheets

EXTRACT SILHOUETTE OF RADIATION SOURCE

REGION V

US 8,742,360 B2

COMPTON CAMERA

TECHNICAL FIELD

The present invention relates to a Compton camera, and in particular to a multi-head Compton camera employed in gamma-ray tomography (acquisition of a three-dimensional distribution image of a gamma-ray source).

BACKGROUND ART

Conventionally, a Compton camera, which is employed as an apparatus for estimating the distribution of a nuclide gamma-ray source by measuring gamma-rays emitted from a target object with a gamma-ray detector disposed within the camera, is used to acquire a two-dimensional image of the gamma-ray source. In Compton cameras a physical collimator can be omitted since the path directions of gamma-rays can be estimated as Compton cones by measuring within the detector successive events of Compton scattering followed by photoelectric absorption. Another feature thereof is that simultaneous imaging of multiple nuclide radiation can be performed by using a semiconductor detector with a high energy resolution as the detector.

Up until now, Compton cameras have mainly been employed in space observation applications, however research has recently accelerated into application of Compton cameras to nuclear medical scanners. In space observation applications, since the purpose is to determine the path directions of gamma-rays, spatial resolution in the depth direction has not been a particular problem. However, when application is made to nuclear medical scanners, maintaining high precision for spatial resolution in all directions becomes necessary.

In a gamma-ray imaging apparatus provided with two divided-electrode type flat-plate germanium semiconductor detectors disposed parallel to each other, gamma-rays emitted from a gamma-ray source placed in front of the detectors are measured. There is a proposal (see, for example, Japanese Patent Application Laid-Open (JP-A) No. 2005-208057) for a gamma-ray imaging apparatus to measure events in which a gamma-ray is first incident to a front detector, undertakes Compton scattering, then the scattered gamma-ray is incident to the back detector where it is totally absorbed. Compton cones are then estimated for the measured events, and by measuring sets of two or more of these events, the position of the gamma-ray is determined as the position where cone surfaces overlap, and an image of the gamma emitting body is generated.

DISCLOSURE OF INVENTION

Technical Problem

In the gamma-ray imaging apparatus of JP-A No. 2005-208057, as long as the detector planes are made sufficiently large, since Compton cone apexes are distributed over a wide solid angle as viewed from the gamma-ray source, sufficient spatial resolution in the depth direction can be achieved. However, due to increasing the surface area of the detectors, difficulties arise from the perspective of manufacturing technology and cost. Furthermore, when the detector surface area is small, since the solid angle occupied by the detector as viewed from the gamma-ray source is small, deterioration of the spatial resolution in the depth direction becomes a problem. Furthermore, when reconstruction of an image is performed based on the radiation source in three-dimensional space, since the number of pixels in three-dimensional space becomes extremely large, a large amount of time required for image reconstruction becomes an issue.

The present invention is made to address the above issues, and a first objective thereof is to provide a Compton camera capable of raising spatial resolution in the depth direction without resorting to increasing the surface area of the detectors. A second objective thereof is to provide a Compton camera capable of shortening the time required for reconstruction of an image based on the radiation source in three-dimensional space.

Solution to Problem

In order to achieve the above first objective, a Compton camera of a first aspect of the present invention is configured including plural detectors, each placed in a position capable of detection of radiation emitted from a target object, detecting Compton scattering due to the radiation and outputting as detection data, and reconstruction unit for projecting each Compton cone obtained from the detection data output from each of the plural detectors onto three-dimensional space and reconstructing an image based on a radiation source.

According to the Compton camera of the first aspect of the present invention, plural detectors, each placed in a position capable of detection of radiation emitted from the target object detect Compton scattering occurring in the radiation and output the detection data. The reconstruction unit projects each Compton cone obtained from the detection data output from each of the plural detectors onto three-dimensional space and reconstructs an image based on the radiation source.

Reconstruction of the shape of the radiation source is accordingly made by projecting the Compton cones obtained from the detection data of the plural detectors onto three-dimensional space, and the respective detectors supplement each other with respect to the precision of spatial resolution in the depth direction of each camera head. Consequently, the spatial resolution in the depth direction can be enhanced without resorting to increasing the surface area of the detectors.

The first aspect of the present invention can be configured such that the reconstruction unit reconstructs the shape of the radiation source by extracting portions where there is a high degree of overlap in the Compton cones projected onto three-dimensional space.

In order to achieve both the above first and second objectives, a Compton camera of a second aspect of the present invention is configured including: plural detectors, each placed in a position capable of detection of radiation emitted from a target object, detecting Compton scattering occurring in the radiation and outputting as detection data; determining unit for determining a three-dimensional space excluding regions where a radiation source is not present by employing a projected image of each Compton cone obtained from the detection data output from each of the plural detectors projected onto a two-dimensional plane; and reconstruction unit for reconstructing an image based on a radiation source by projecting each of the Compton cones obtained from the detection data output from each of the plural detectors onto the three-dimensional space determined by the determining unit.

According to the Compton camera of the second aspect of the present invention, the determining unit determines the three-dimensional space excluding the regions where the radiation source is not present by employing the projected image of each Compton cone obtained from the detection data output from each of the plural detectors projected onto a two-dimensional plane. The reconstruction unit reconstructs an image based on the radiation source by projecting each of the Compton cones obtained from the detection data output from each of the plural detectors onto the three-dimensional space determined by the determining unit.

Since the Compton cones are accordingly projected onto the three-dimensional space determined based on images projected onto two-dimensional planes, in addition to the above effect the time required for image reconstruction can also be shortened, since the region for performing processing is limited in comparison to cases in which reconstruction of images is performed by projecting the Compton cones directly onto three-dimensional space having a large number of pixels in the projection region.

The second aspect of the present invention can also be configured such that the determining unit estimates for each of the detectors a silhouette of a radiation source from portions where there is a high degree of overlap between the Compton cones projected onto the two-dimensional plane, and excludes regions where the radiation source is not present based on the detection planes and silhouettes for the respective detectors.

The first and second aspects of the present invention can also be configured such that radiation emitted from a nuclide contained in a pharmacological agent administered to a subject is detected by the detectors and diagnostic image reconstruction is performed on the subject by the reconstruction unit.

Furthermore, the detector in the above first and second aspects may be a camera head.

Advantageous Effect of Invention

According to the Compton camera of the present invention as explained above, an effect is exhibited in that the spatial resolution in the depth direction can be enhanced without resorting to increasing the surface area of the detectors. A further effect exhibited is that, by greatly reducing the number of pixels requiring computation during reconstruction of an image based on a radiation source in three-dimensional space, the time required for image reconstruction can be reduced.

BEST MODE FOR CARRYING OUT THE INVENTION

Detailed explanation follows of exemplary embodiments of the present invention, with reference to the drawings.

Figure 1A:
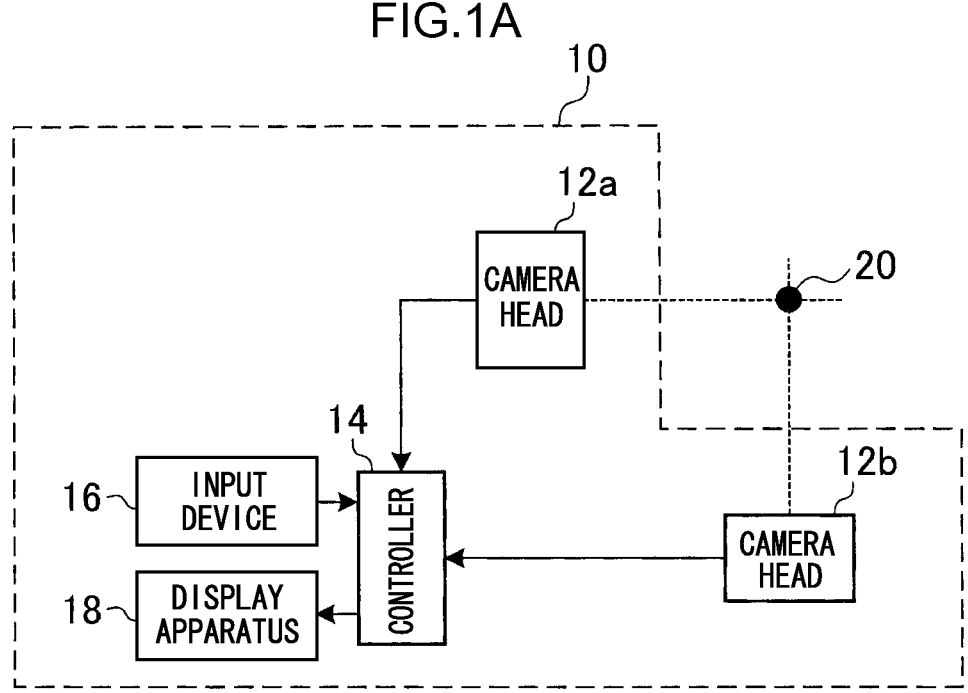
FIG. 1A is a block diagram showing a schematic configuration of a Compton camera according to the present exemplary embodiment.

As shown in FIG. 1A, a Compton camera 10 according to a first exemplary embodiment is configured including: two camera heads (detectors) 12a, 12b placed with detection planes facing a radiation source 20; a controller 14 for controlling image reconstruction; an input device 16 for performing input of operation instructions and the like, configured by a keyboard, a mouse or the like; and a display apparatus 18 for displaying reconstructed images.

Figure 2:
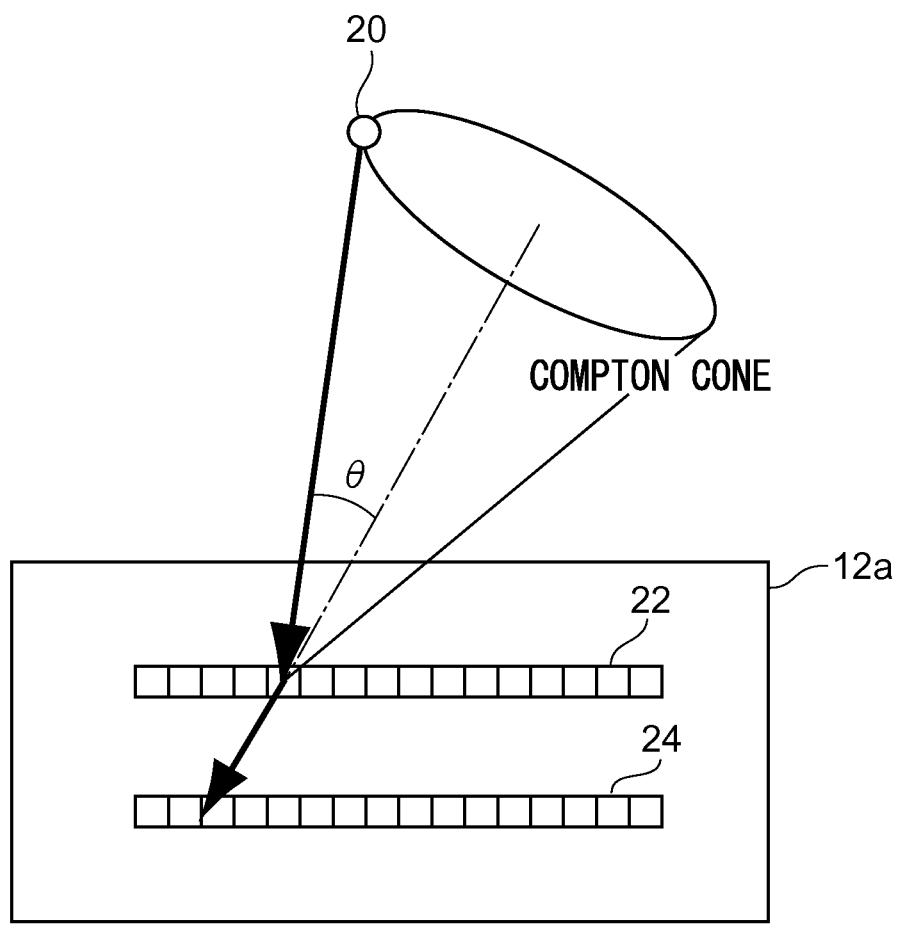
FIG. 2 is a schematic diagram showing a configuration of camera heads and Compton cone estimation principles.

The camera heads 12a, 12b serve as the detectors of the present invention, and as shown in FIG. 2, are configured by a front detector 22 and a back detector 24. In the camera heads 12a, 12b, for example, silicon (Si) can be employed as the front detector 22, and a Si/CdTe semiconductor detector utilizing cadmium telluride (CdTe) can be employed as the back detector 24. Note that, for explanation purposes a case shown in FIG. 2 is explained in which there is a single sheet of the back detector 24, however the camera heads 12a, 12b used in the Compton camera 10 of the present exemplary embodiment are provided with plural back detectors 24. Since provision of plural back detectors 24 enables detection of radiation to be made with good precision, the estimation precision of Compton cones, described later, is also raised.

Figure 1B:
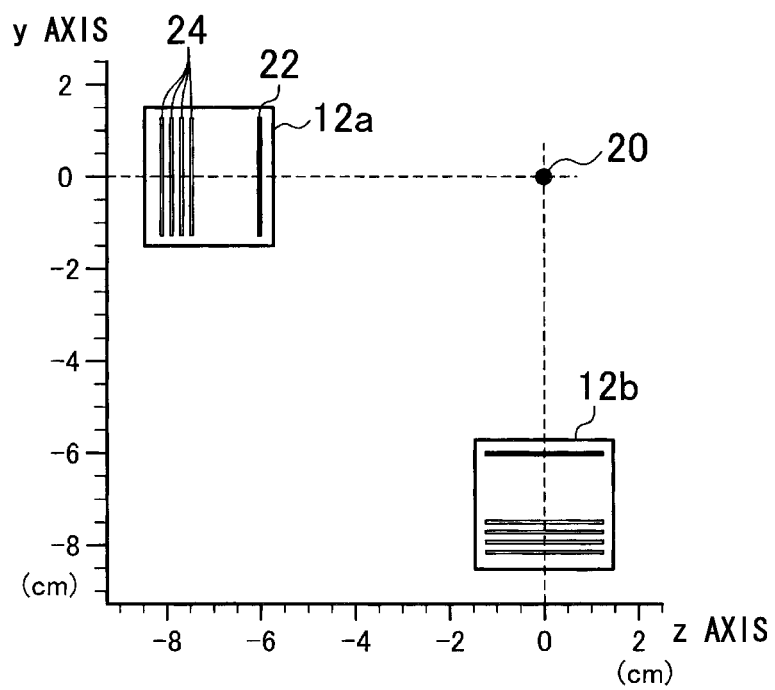
FIG. 1B is a diagram showing a placement of camera heads in a Compton camera according to the present exemplary embodiment.

The camera heads 12a, 12b are placed such that normal lines passing through the center of their respective detection planes cross at right angles. In explanation of the yz coordinate system shown in FIG. 1B, the camera head 12a is placed with respect to the radiation source 20 disposed at the origin of the coordinate system such that its detection plane is on the z axis and parallel to the y axis, and the camera head 12b is placed such that its detection plane is on the y axis and parallel to the z axis.

The controller 14 is configured including: a CPU for performing overall control of the Compton camera 10; ROM, serving as a storage medium on which various programs and the like are stored, such as programs for image reconstruction processing, described later; RAM for acting as working space and temporarily storing data; a Hard Disk Drive (HDD) acting as storage unit on which various data is stored; a network interface (I/F) section for connecting to a network; an input-output (I/O) port; a bus for connecting all these sections together; and the like. The input device 16 and the display apparatus 18 are connected to the I/O port. The controller 14 is connected to both the camera heads 12a, 12b, and detection data detected by the camera heads 12a, 12b is input to the controller 14.

Explanation now follows regarding detection of Compton scattering by radiation and the principles of Compton cone estimation in the camera heads 12a, 12b. Since similar operation occurs in the camera head 12a and the camera head 12b, explanation here will be given regarding operation of the camera head 12a, and explanation regarding the camera head 12b will be omitted.

As shown in FIG. 2, radiation irradiated from the radiation source 20 is incident on the front detector 22, undergoes Compton scattering, and is then incident to the back detector 24 where it is absorbed. The camera head 12a outputs as detection data the radiation incident positions on the front detector 22 and the back detector 24, and the energy absorbed by the front detector 22 and the back detector 24. The scattering angle θ is derived based on Compton shift in the detection data. A Compton cone is derived thereby with a central axis of the line passing through the incident position of radiation to the front detector 22 and the incident position to the back detector 24, apex at the incident position of radiation to the front detector 22, and a 2θ apex angle. Since the radiation source 20 must be present somewhere on the surface of this cone, the position of the radiation source 20 can be determined by acquisition of detection data multiple times and by superimposition of these Compton cones.

Figure 3:
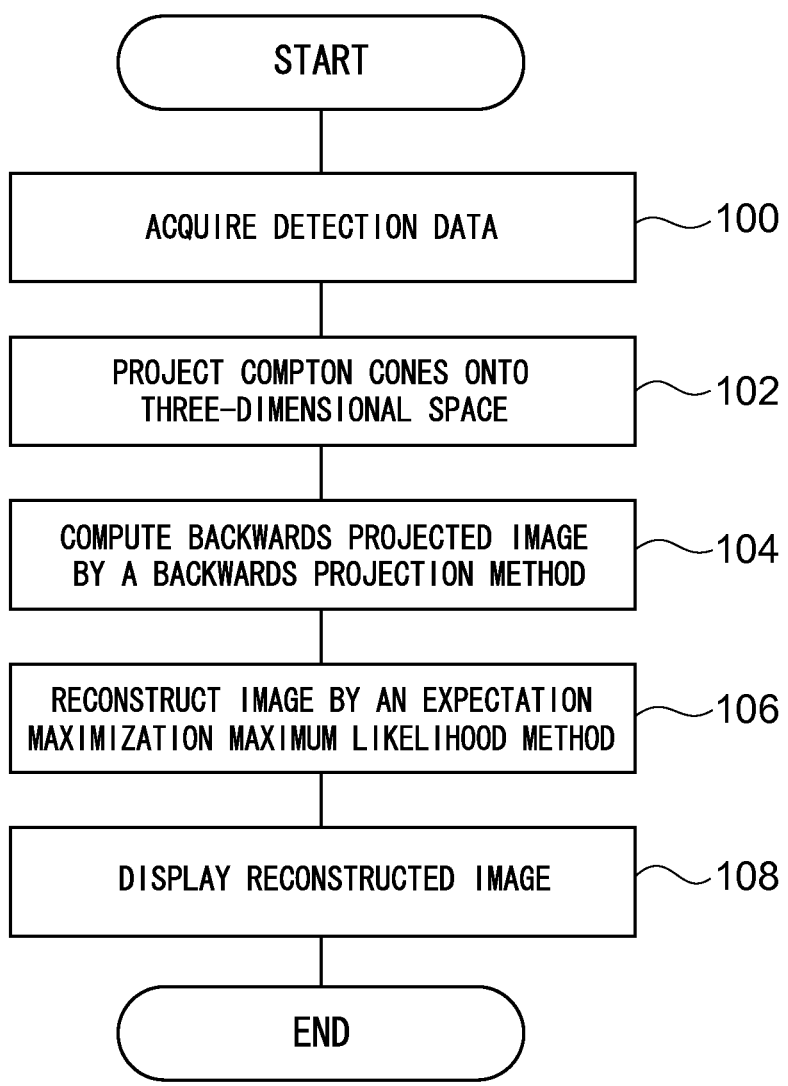
FIG. 3 is a flow chart showing a processing routine for image reconstruction processing in a Compton camera of a first exemplary embodiment.

Explanation now follows regarding a processing routine for image reconstruction processing in the Compton camera 10 of the first exemplary embodiment, with reference to FIG. 3.

Figure 4:
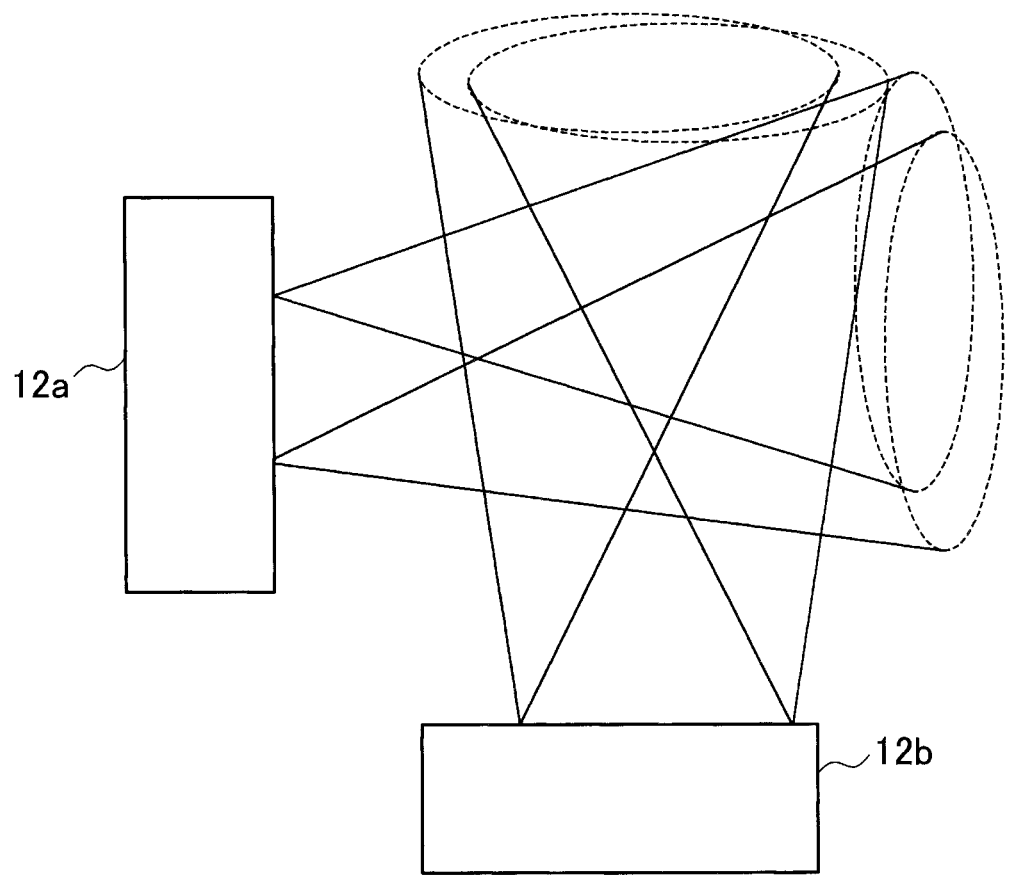
FIG. 4 is a diagram showing an example of a Compton cone projected onto three-dimensional space.

At step 100, detection data output from the camera heads 12a, 12b is acquired. Next, at step 102, as shown in FIG. 4, Compton cones obtained from the acquired detection data is projected onto three-dimensional space. In the example in FIG. 4, a case in which four Compton cones are projected is shown, however in practice all of the Compton cones acquired from the detection data are projected.

Figure 5A:
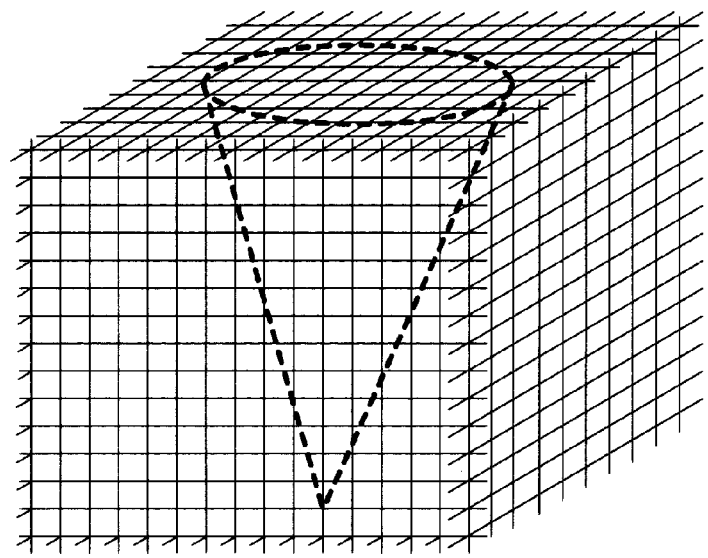
FIG. 5A is diagram for explaining a backwards projection method onto three-dimensional space.
Figure 5B:
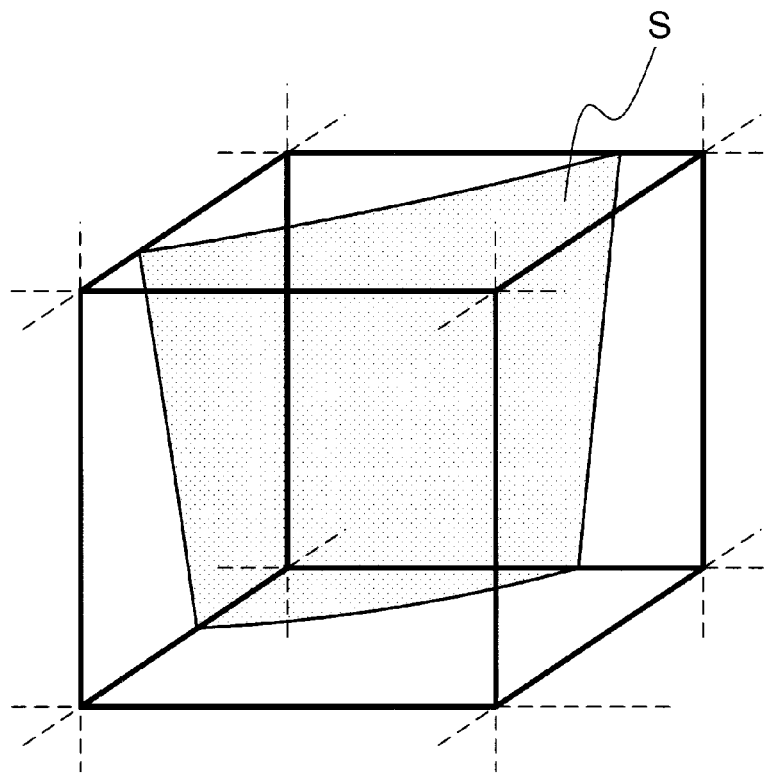
FIG. 5B is a diagram of an enlarged portion of FIG. 5A.

Next, at step 104, a backwards projection image is computed by a backwards projection method based on the projected Compton cones. As a specific method, as shown in FIG. 5A, the three-dimensional space is divided into fine pixels, for example cube shaped pixels, and the Compton cones are projected onto this three-dimensional space. FIG. 5B shows an enlargement of a single pixels worth of a pixel section including the surface of a Compton cone. Weightings are assigned according to the surface area S of the portion of the Compton cone surface included in the pixel portion and frequencies are summed for each of the pixels. Each of the Compton cones obtained from all of the detection data is projected, and by taking a sum of the frequencies, a backwards projection image is computed with the frequencies concentrated in a region in which the radiation source 20 is present.

Next, in step 106, in order to reconstruct an image based on the radiation source 20 an expectation maximization maximum likelihood method is employed on the backwards projected image computed at step 104. The processing of step 104 is processing employed to attain higher precision for image reconstruction, since there are sometimes frequencies of components present not due to the radiation source 20. The detector response is computed for the radiation distribution estimated as the position of the radiation source 20 from the backwards projected image obtained by a backwards projection method, and this computed result is compared with the actual detected data. Correction is then performed to the backwards projected image so as to give closer alignment with the radiation distribution received. This processing is repeated a number of times to finally obtain a distribution close to that of the actual radiation source distribution, and an image is reconstructed.

Next, at step 108, the reconstructed image is displayed on the display apparatus 18, thereby completing the processing.

Figure 6A:
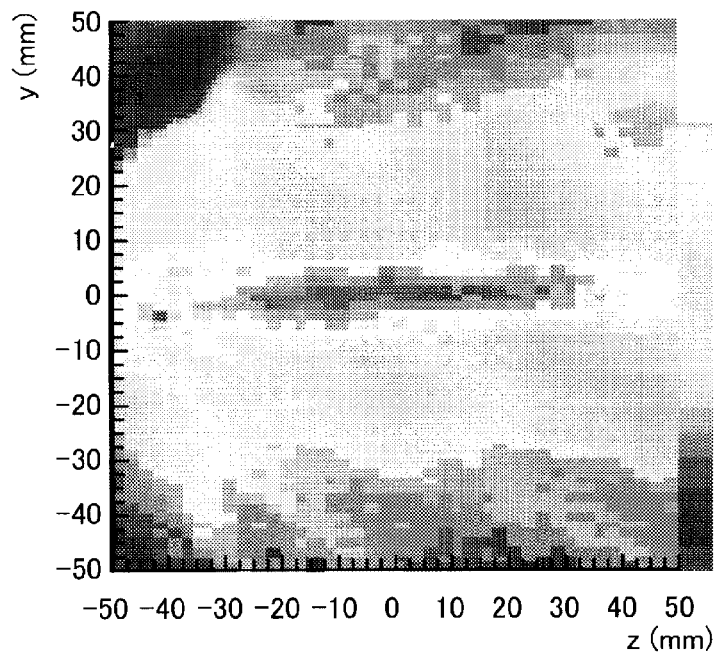
FIG. 6A is a diagram showing a backwards projected image by a Compton camera equipped with a single camera head.
Figure 6B:
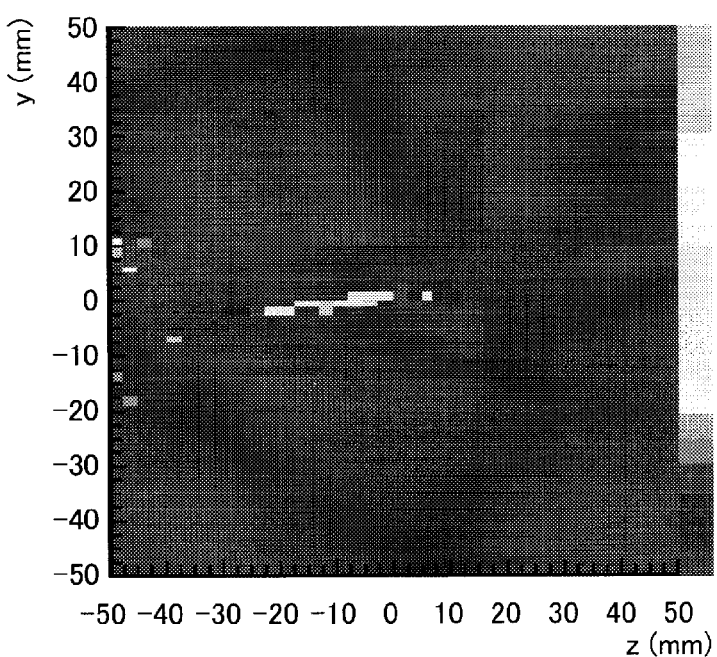
FIG. 6B is a diagram showing an estimation result from applying an expectation maximization maximum likelihood method to a backwards projected image.
Figure 6C:
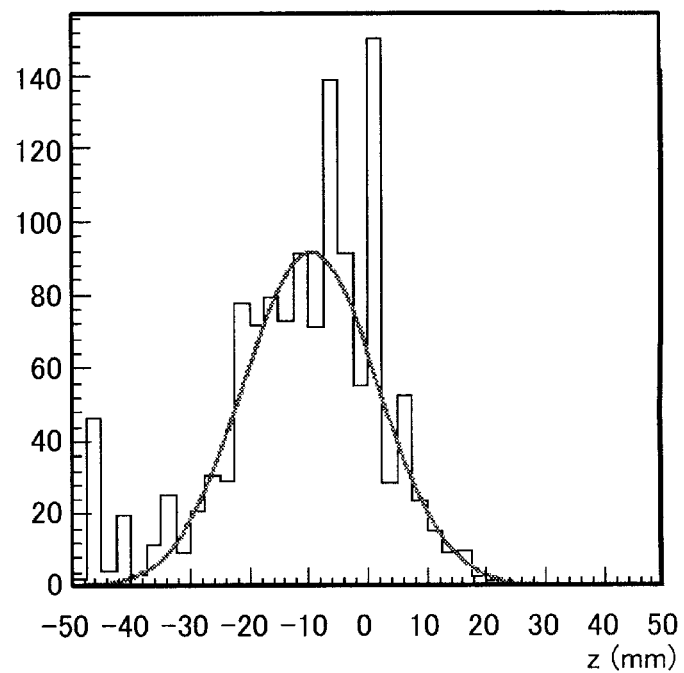
FIG. 6C is a diagram showing an z-axis radiograph of the distribution of FIG. 6B.

An example of a simulation result of spatial resolution for a case where measurements are taken of a point radiation source using conventional technology equipped with a Compton camera provided with a single camera head is shown in FIG. 6A to FIG. 6C. The placement of the camera head and point radiation source is similar to the placement of the camera head 12a and the radiation source 20 of the present exemplary embodiment shown in FIG. 1A. FIG. 6A is a backwards projected image, FIG. 6B is an estimation result from performing an expectation maximization maximum likelihood method on the backwards projected image of FIG. 6A. FIG. 6C is a z axis radiograph of the distribution of FIG. 6B. It can be seen from FIG. 6B that the frequency distribution is elongated in the horizontal direction, with the resolution on the z axis direction, this being the depth direction, extremely poor in comparison to that on other axis (the y axis). When the z axis radiograph is approximated to a Gaussian distribution it has a standard deviation value σ of about 11 mm.

Figure 7A:
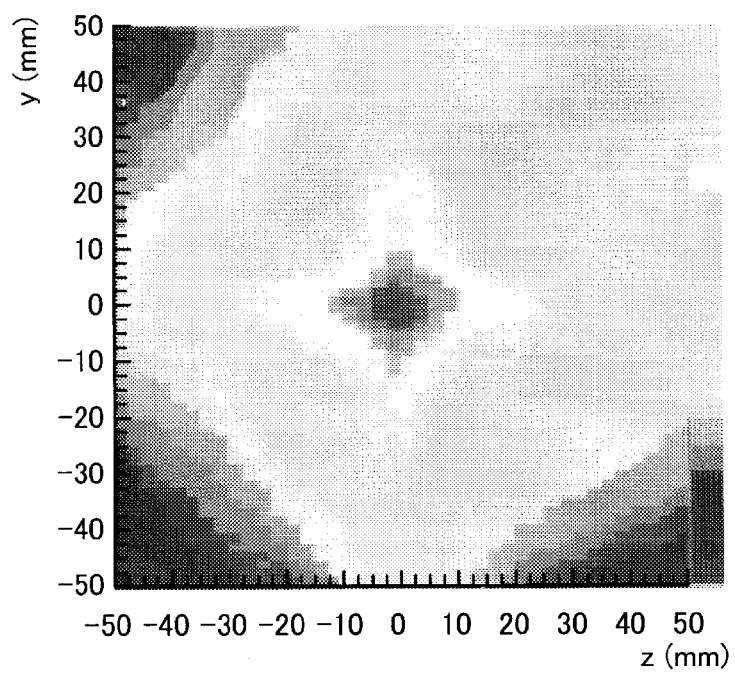
FIG. 7A is a diagram showing a backwards projected image by a Compton camera according to the present exemplary embodiment.
Figure 7B:
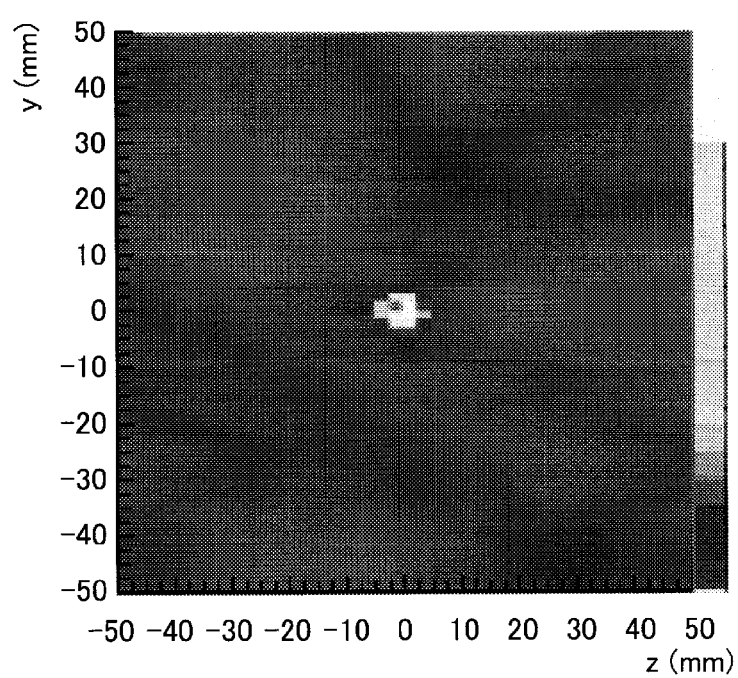
FIG. 7B is a diagram showing an estimation result from applying an expectation maximization maximum likelihood method to a backwards projected image.
Figure 7C:
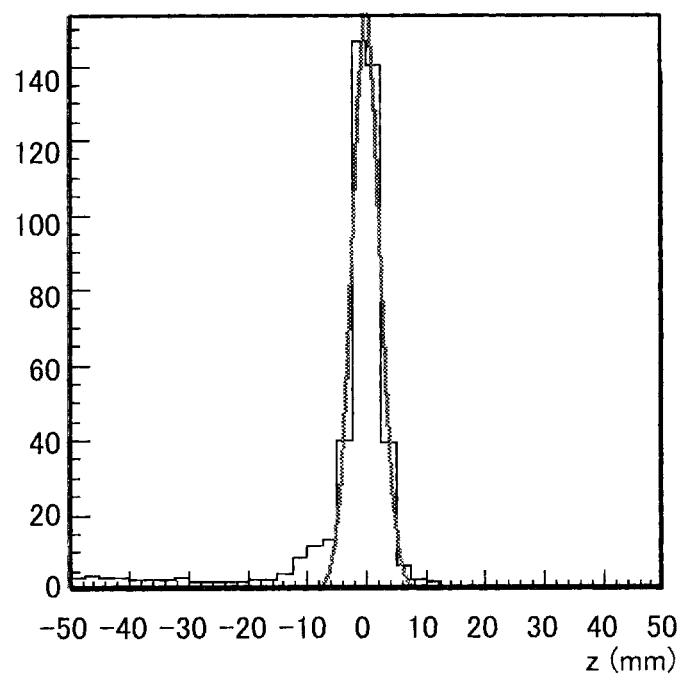
FIG. 7C is a diagram showing an z-axis radiograph of the distribution of FIG. 7B.
Figure 8:
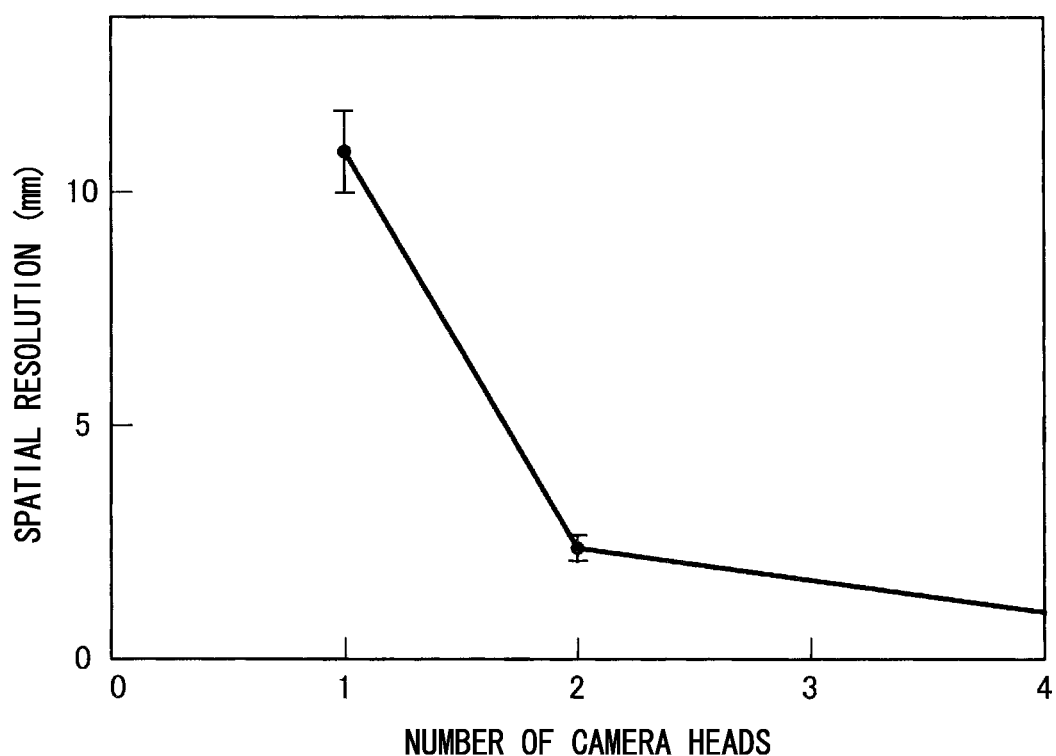
FIG. 8 is a graph showing spatial resolution in the depth direction against number of camera heads.

In contrast thereto, a simulation result from the Compton camera 10 according to the present exemplary embodiment is shown in FIG. 7A to FIG. 7C. FIG. 7A is a backwards projected image, FIG. 7B is an estimation result from performing an expectation maximization maximum likelihood method on the backwards projected image of FIG. 7A, FIG. 7C is a z axis radiograph of the distribution of FIG. 7B. When the z axis radiograph of FIG. 7C is approximated to a Gaussian distribution it has a standard deviation value σ of about 2.4 mm, and an improvement can be seen by comparison to a single camera head (see FIG. 8).

Figure 9A:
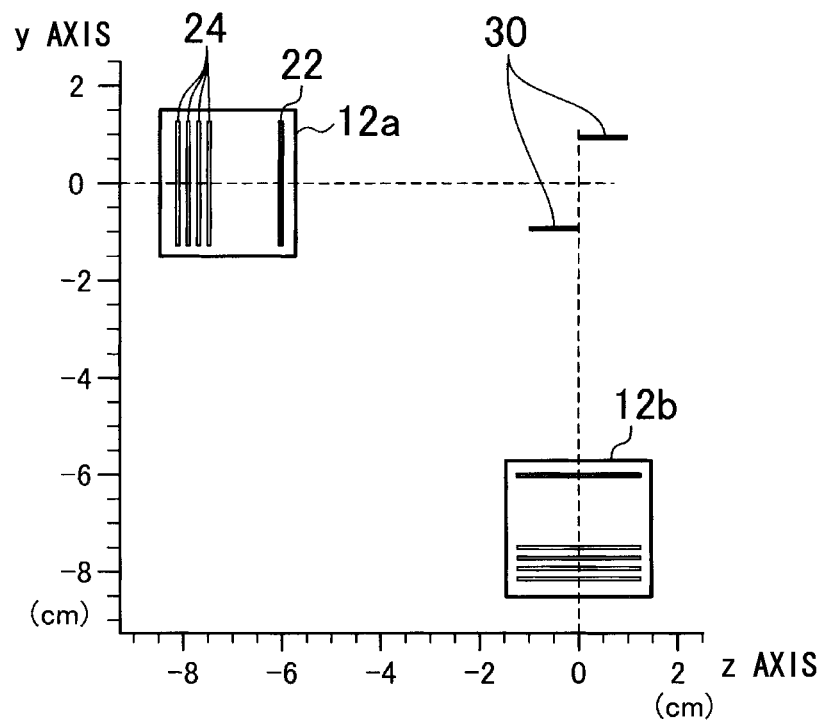
FIG. 9A is a diagram showing a placement of radiation sources and camera heads when measuring two rod shaped radiation sources.
Figure 9B:
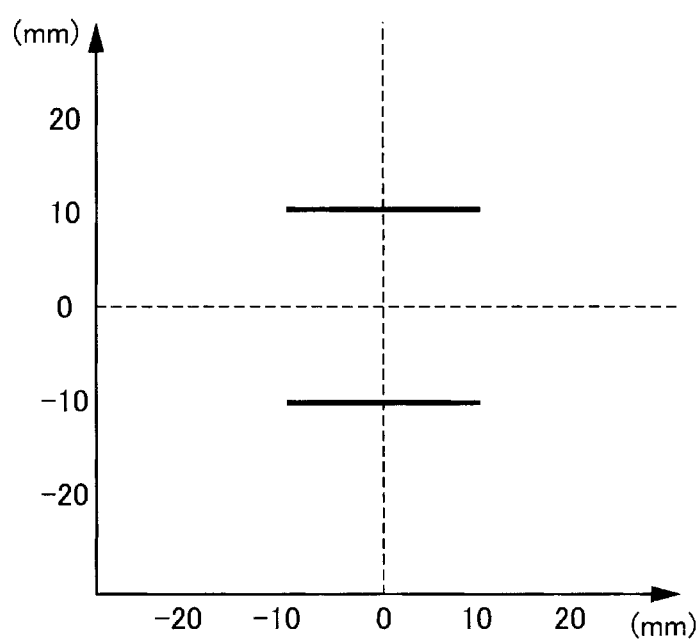
FIG. 9B is a diagram showing an image reconstructed by two-dimensional image reconstruction using a conventional technique.
Figure 9C:
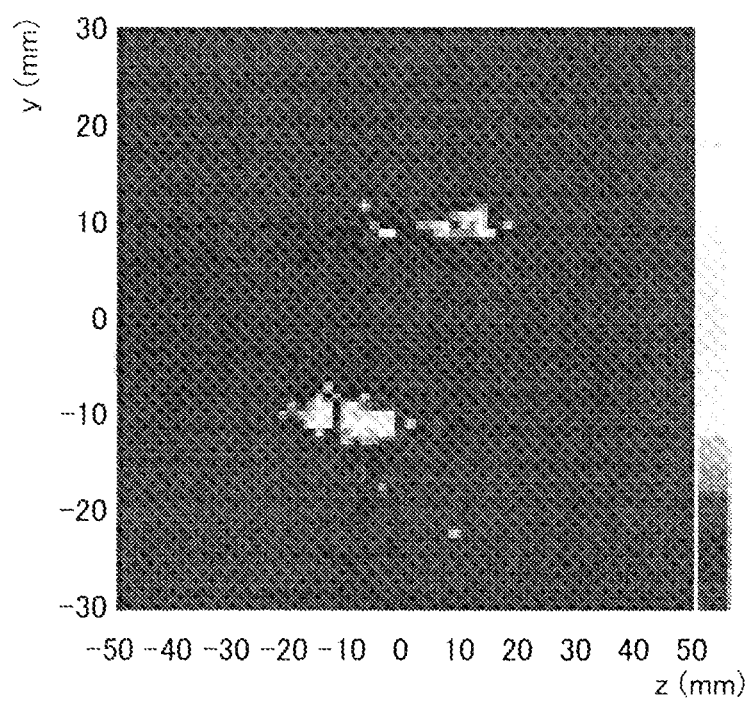
FIG. 9C is a diagram showing an image reconstructed using the Compton camera of the present exemplary embodiment.

Furthermore, when two rod shaped radiation sources 30 are placed as shown in FIG. 9A, and reconstruction is performed using a conventional technique for two-dimensional image reconstruction, then this only leads to obtaining a radiograph for each of the respective camera heads. However, by performing image reconstruction in three-dimensional space as in the present exemplary embodiment, the depth direction spatial resolution data held by each of the respective cameras is not discarded, enabling it to be used in image reconstruction. This enables an image to be obtained that reflects the positional displacement between the two rod shaped radiation sources 30, as shown in FIG. 9C.

As explained above, according to the Compton camera 10 of the first exemplary embodiment, since an improvement in depth direction spatial resolution can be achieved by placement of two camera heads, this enables the depth direction spatial resolution to be raised without increasing the surface area for the detection plane of each camera head. Furthermore, performing image reconstruction in three-dimensional space enables the depth direction data captured by each of the camera heads to be employed in image reconstruction, rather than it being discarded, raising image reconstruction precision.

Note that in the first exemplary embodiment, explanation has been given of a case in which two camera heads are placed such that normal lines to their detection planes are orthogonal to each other, however configuration may be made with three or more camera heads. Furthermore, with respect to the placement of each of the camera heads, placement may be performed so as to compensate for deficiencies in the depth direction spatial resolution of other camera heads.

Explanation now follows regarding a Compton camera according to a second exemplary embodiment. While explanation in the first exemplary embodiment was of a case in which a backwards projection method and an expectation maximization maximum likelihood method were employed directly to three-dimensional space during image reconstruction, explanation in the second exemplary embodiment is of a case in which a combination of two-dimensional and three-dimensional image reconstruction is performed. Note that since the configuration of the Compton camera according to the second exemplary embodiment is similar to that of the Compton camera 10 of the first exemplary embodiment, further explanation is omitted.

Figure 10:
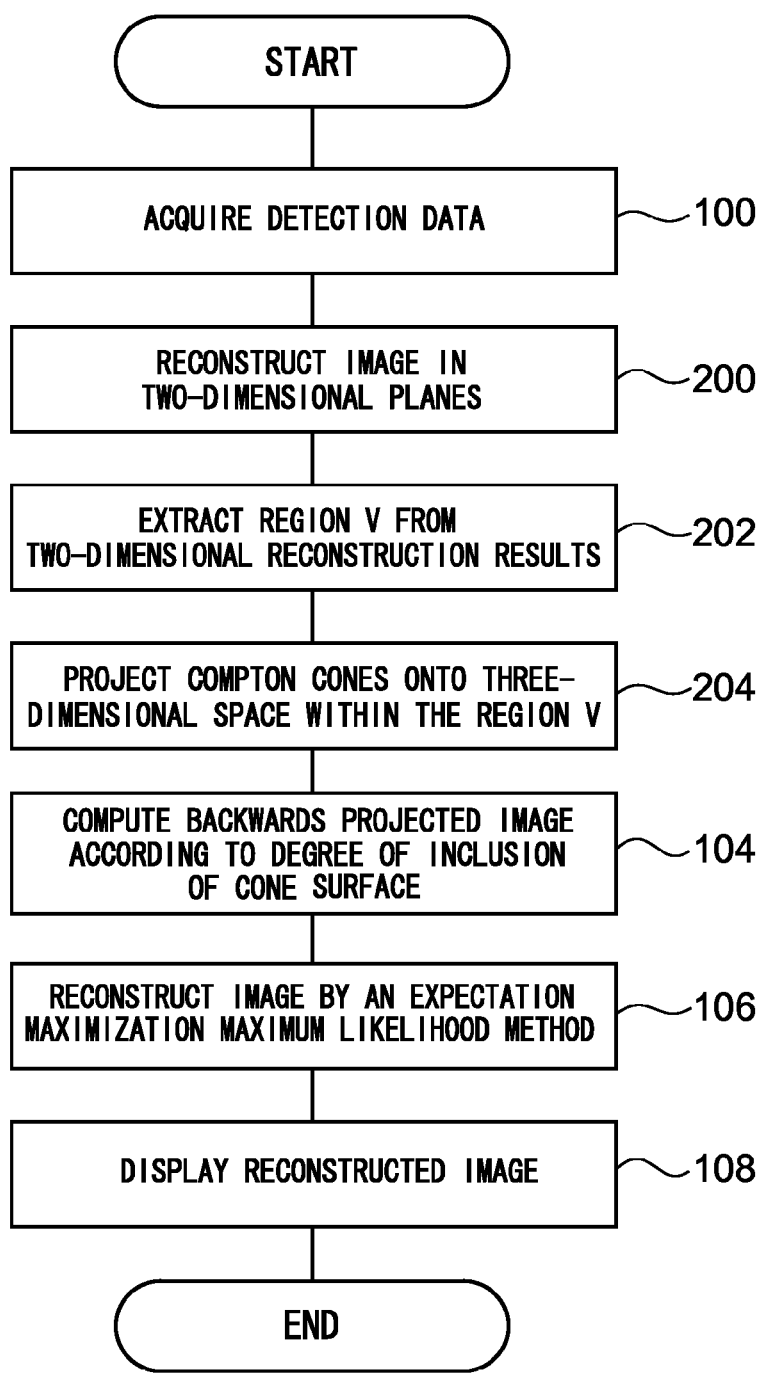
FIG. 10 is a flow chart showing a processing routine for image reconstruction processing in a Compton camera of a second exemplary embodiment.

Explanation follows regarding a processing routine for image reconstruction processing in the Compton camera 10 of the second exemplary embodiment, with reference to FIG. 10. Processing similar to that of the image reconstruction processing of the Compton camera 10 of the first exemplary embodiment is allocated the same reference numeral, and further explanation thereof is omitted.

Figure 11A:
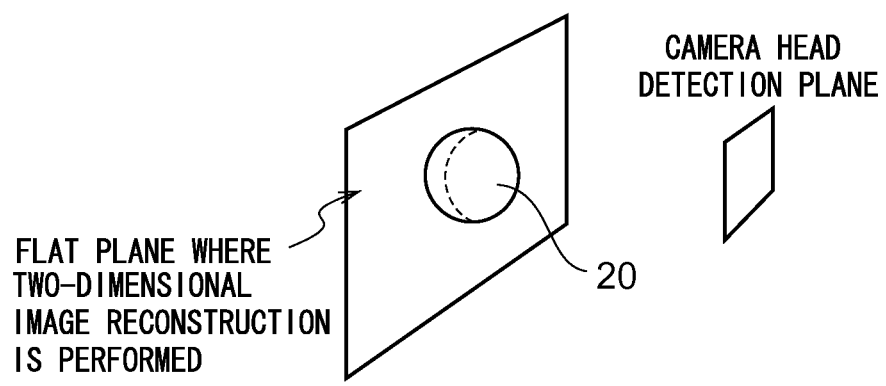
FIG. 11A is a diagram showing a flat plane at a presumed positioned of a radiation source in region extraction of the second exemplary embodiment.

At step 200, a Compton cone obtained from the acquired detection data is projected onto a two-dimensional plane. As shown in FIG. 11A, the separation distances from each of the camera heads 12a, 12b to a radiation source 20 are postulated, and two-dimensional planes parallel to the detection planes of the camera heads 12a, 12b are considered at the postulated position of the radiation source 20. Note that, as the separation distances to the radiation source 20, the distances from the detection planes of each of the camera heads 12a, 12b to the point at which the normal lines to the detection planes of the camera heads 12a, 12b intersect, or to the surface of a radiation source actually measured using a known technique may be employed.

Figure 11B:
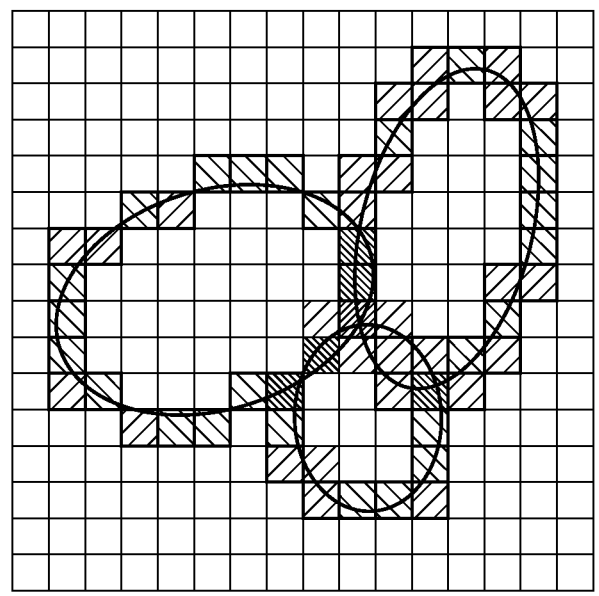
FIG. 11B is an explanatory diagram of a backwards projection method onto two-dimensional space in region extraction of the second exemplary embodiment.
Figure 11C:
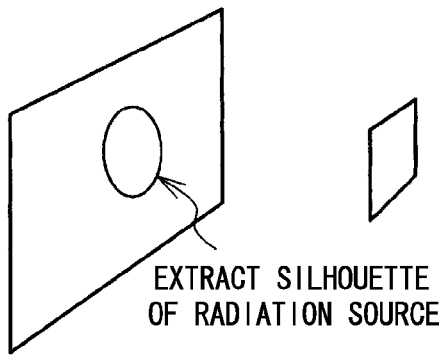
FIG. 11C is a diagram illustrating a silhouette of a radiation distribution from two-dimensional image reconstruction results in region extraction of the second exemplary embodiment.

Compton cones based on the detection data are projected onto these planes, leaving traces of ellipses. These ellipses are then used to compute backwards projected images at the two-dimensional planes by a backwards projection method. Specifically, as shown in FIG. 11B, the two-dimensional plane is partitioned into fine pixels, weightings are allocated according to the length of ellipse included in each of the pixels, and frequencies summed. An expectation maximization maximum likelihood method is then applied and image reconstruction is performed, and a significant radiation source distribution silhouette 32 is extracted from the two-dimensional image reconstruction result, like that shown in FIG. 11C.

Figure 11D:
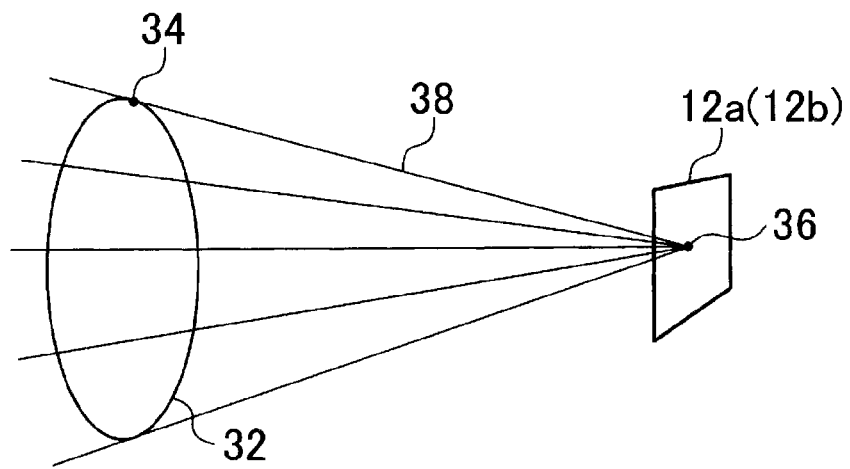
FIG. 11D is an explanatory diagram of extracting a region v in region extraction of the second exemplary embodiment.
Figure 11E:
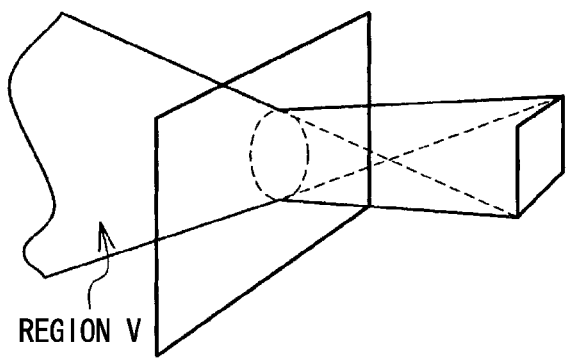
FIG. 11E is a diagram illustrating an extracted region V where significant radiation source is present in three-dimensional space in region extraction of the second exemplary embodiment.

Next, at step 202, as shown in FIG. 11D, a region v is extracted determined by a set of straight lines 38 each connecting between an arbitrary single point 34 on the derived radiation source distribution silhouette 32, and an arbitrary single point 36 on the detection plane corresponding to the silhouettes on the front detector 22 of each of the camera heads 12a, 12b. The regions v are extracted for each of the camera heads 12a, 12b, then a region V where significant radiation is present in three-dimensional space, as shown in FIG. 11E, is extracted from common portions of all of the regions v.

Next, in step 204, in processing similar to that of step 102 of the image reconstruction processing of the first exemplary embodiment, Compton cones based on the detection data are projected onto the three-dimensional space within the region V extracted at step 202. Then in the following step 104 and step 106, an image based on the radiation source 20 is reconstructed using a backwards projection method and an expectation maximization maximum likelihood method.

In comparison to two-dimensional image reconstruction, three-dimensional image reconstruction involves a greater number of pixels and one additional degree of freedom in the distribution to be derived. However, as explained above, according to the Compton camera of the second exemplary embodiment, by performing processing only to a restricted target region during the three-dimensional reconstruction, the time required for image reconstruction can be shortened in comparison to cases where image reconstruction is performed directly in three-dimensions.

Note that in the second exemplary embodiment, while explanation has been given of a case in which image reconstruction is performed by application of a backwards projection method and an expectation maximization maximum likelihood method to two-dimensional planes in the above step 200, there is no particular limitation thereto. For example, Fourier transformation method may instead be employed for performing image reconstruction.

The invention claimed is:

1. A Compton camera comprising:
   at least one processor;
   at least one computer-readable medium;
   a plurality of camera heads each comprising a plurality of detectors, each camera head placed in a position capable of detection of radiation emitted from a target object, detecting Compton scattering due to the radiation and outputting detection data comprising Compton cones; wherein at least two of the camera heads are placed such that normal lines passing through the center of their respective detection planes cross at right angles;
   a first reconstruction unit for reconstructing a two-dimensional projected image; wherein at least one of the computer-readable media stores instructions to instruct at least one of the processors to cause the first reconstruction unit to perform the steps of:
      determining a crossing point at which the normal lines of the at least two camera heads cross; and
      for each of the at least two camera heads, determining a two-dimensional plane located at the crossing point and parallel to the detection plane of the camera head and two-dimensionally projecting each of the Compton cones obtained from the detection data output from the camera head onto said two-dimensional plane to form a two-dimensional projected image;
   a determining unit for determining a second three-dimensional region; wherein at least one of the computer-readable media stores instructions to instruct at least one of the processors to cause the determining unit to perform the steps of:

for each of the at least two camera heads, generating a first three-dimensional region determined by a set of straight lines each connecting between a point on the two-dimensional projected image and a point on the detection plane; and determining the common portions of the first three-dimensional regions determined for each of the at least two camera heads to form a second three-dimensional region; and a second reconstruction unit for reconstructing an image based on a radiation source; wherein at least one of the computer-readable media stores instructions to instruct at least one of the processors to cause the second reconstruction unit to perform the step of three-dimensionally projecting each of the Compton cones obtained from the detection data output from each of the plurality of camera heads onto the second three-dimensional region determined by the determining unit.

2. The Compton camera of claim 1, wherein the radiation is emitted from a nuclide contained in a pharmacological agent administered to a subject and is detected by the camera heads and diagnostic image reconstruction is performed on the subject by the first and second reconstruction units.

* * * * *